Oct. 28, 1941.   J. L. VAN PELT   2,260,874
FILTER
Filed Dec. 4, 1939

INVENTOR.
Jess L. Van Pelt
BY
Glenn L. Fish
ATTORNEYS.

Patented Oct. 28, 1941

2,260,874

UNITED STATES PATENT OFFICE 2,260,874

FILTER

Jess L. Van Pelt, Rosalia, Wash.

Application December 4, 1939, Serial No. 307,513

6 Claims. (Cl. 210—165)

This invention relates to filters and more particularly to a filter adapted for use as means for straining oil delivered into the fuel tank of a Diesel engine. It is to be understood, however, that the filter may be used for straining any liquid flowing from a source of supply through a hose or pipe to a place of use or storage.

One object of the invention is to provide a filter of such construction that it may be applied to a hose and constitute a filtering nozzle wherein oil or other liquid will be strained and dirt and other foreign matter removed therefrom as it is discharged from the hose.

Another object of the invention is to provide a filter adapted to be applied to a hose and having a discharge spout or stem adapted to be engaged in the inlet pipe of a storage tank so that as strained oil is discharged from the filter it may flow directly into the inlet pipe of the tank.

Another object of the invention is to provide a filter of such construction that a hollow foraminous filtering member carried by its discharge spout or stem is enclosed in a casing or shell defining an oil receiving chamber about the filtering member and provided with an inlet neck adapted for connection with a hose leading from a source of supply.

Another object of the invention is to so form the filtering member that a tube of wire screening or other foraminous material forming a portion thereof will be reinforced by a framework which serves very effectively as a reinforcement without interfering with the flow of oil through the screen.

Another object of the invention is to provide a filter wherein the shell or casing is detachably held in place by securing means carried by the filtering member, the shell being easily removable for cleaning of the filtering member when the securing means is released.

The invention is illustrated in the accompanying drawing, wherein.

Figure 1:
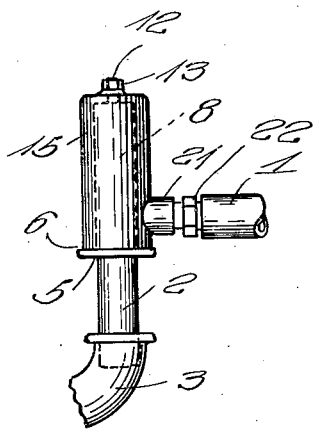
Fig. 1 is a side elevation of the improved filter.

This improved filter is intended for use in connection with a hose 1 through which oil or other liquid flows from a source of supply to a storage tank or place of use and, in Fig. 1, the discharge spout or neck 2 of the filter has been shown engaged in the filling pipe 3 of a storage tank (not shown) for a Diesel engine, oil burner, or the like. It will be understood that the oil or other liquid may be discharged from the spout 2 into the storage tank or chamber of any machine or apparatus. A cap 4, which is removably applied to the outer end of the spout, is provided as a shield to prevent dust or the like from entering the spout when the filter is not in use.

Figure 2:
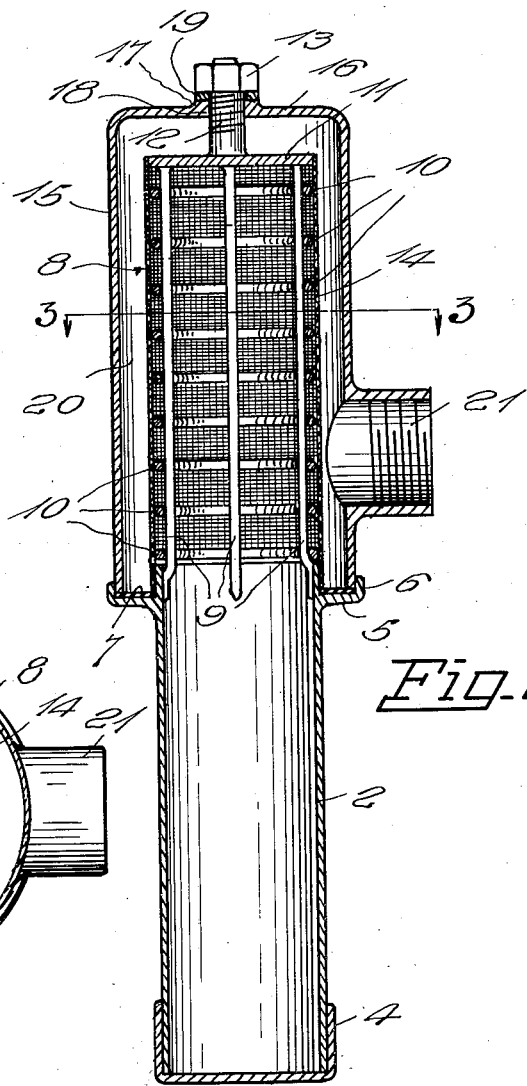
Fig. 2 is a sectional view on an enlarged scale taken longitudinally through the improved filter.
Figure 3:
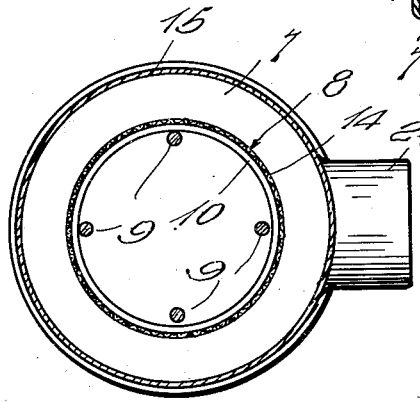
Fig. 3 is a transverse sectional view taken on the line 3—3 of Fig. 2.

The spout may be of any length and diameter desired and, in spaced relation to its upper end, carries an outstanding circumferentially extending collar 5 bordered by an upstanding flange 6. The upper end portion of the spout will thus extend above the collar and, by referring to Fig. 2, it will be seen that upon this collar is placed a gasket 7. The filtering member 8 extends longitudinally from the upper end of the spout 2 in axial alinement therewith and has an open frame formed of rods 9 and rings 10. Lower ends of the rods extend into and are welded or otherwise fixedly secured to walls of the protruding upper portion of the spout. At their upper ends, the rods are fixedly secured to a disc 11 of stiff metal from which extends a centrally located threaded stem or bolt 12 carrying a nut 13. A tubular sleeve 14, formed of wire screening or other suitable foraminous material, fits snugly about the rings 10 with its lower end portion fitting tightly about and welded to the protruding upper portion of the spout 2 and its upper end fitting about and welded to the peripheral edge face of the disc 11. The screening from which the sleeve 14 is formed is of sufficiently fine mesh to prevent dust and dirt from passing through the same but allows oil or other liquid to freely flow through it. Therefore, dirt and other foreign matter will gather upon the outer surface of the sleeve of screening and only clear liquid will flow through the spout 2 from the filtering member.

The shell or casing 15 is formed of metal and is of cylindrical shape, a head 16 being provided at the upper end of the shell and the lower end thereof being open. At the center of the head 16 is formed a thickened portion or boss 17 through which an opening 18 is formed to receive the bolt 12 and when a gasket 19 is applied to the bolt 12 and the nut 13 threaded upon the bolt and tightened, a sealed joint will be formed about the bolt and the shell forced downwardly to compress the gasket 7 upon which it rests and form a sealed joint at the bottom of the shell. The diameter of the shell is such that the flange 6 fits snugly about its lower end portion and the walls and head of the shell are spaced from the filtering member to provide a chamber 20 which is to be filled with unfiltered oil. An internally threaded inlet neck 21 extends radially from the lower portion of the shell to receive a coupling 22 carried by the hose or carried by the neck and having the hose secured thereto in any desired manner. When the neck 21 is connected with the hose by the coupling, the filter constitutes a discharge nozzle for the hose and, by inserting the spout 2 into the inlet pipe 3 of a storage tank, oil may be delivered from the hose directly into the pipe after passing through the filter. As the oil enters the filter, it fills the oil chamber 20 and then passes through the screen or foraminous sleeve 14 of the filtering member 8 and flows from the filtering member through the spout 2 into the pipe 3 as clean oil. All dirt and other foreign matter entering the shell with the oil gathers upon the sleeve 14. When such a quantity of foreign matter has gathered upon the sleeve of screening so that the screen becomes clogged, the nut 13 is unscrewed, thus permitting the stem or bolt to pass inwardly through the opening 18 and the filtering member may be withdrawn from the shell along with the spout. The screen and other portions of the filtering member can then be thoroughly cleaned and the filter reassembled.

Having thus described the invention, what is claimed is:

1. A filter of the character described comprising a shell having an inlet, a tubular outlet neck extending into said shell and provided with an outstanding annular flange engaging the lower end of the shell and constituting a bottom for the shell, a cylindrical filtering member in said shell spaced from walls thereof, the filtering member being of rigid construction and having its lower end secured about the upper end of said neck, a head for the upper end of the filtering member having a threaded stem carried thereby and extending upwardly therefrom through the top of said shell, and a securing nut carried by said stem and engaging the top of the shell to force the shell downwardly and firmly hold the shell seated against the flange.

2. A filter of the character described comprising a shell having an inlet, a tubular outlet neck extending into said shell and provided with an outstanding annular flange engaging the lower end of the shell and constituting a bottom for the shell, a cylindrical filtering member in said shell formed of foraminous material and having its lower end secured about the upper end of said neck, a head for the upper end of said filtering member, rods extending longitudinally through the filtering member and secured at their ends to the head and the upper end of said neck, rings surrounding said rods within the filtering member and spaced from each other circumferentially thereof and together with the rods forming a reinforcing frame for the filtering member, a threaded stem extending upwardly from said head through the top of said shell, and a securing nut carried by said stem and engaging the top of the shell to firmly hold the shell seated against the flange.

3. A filter of the character described, comprising a tube constituting an outlet spout for the filter, a rigid cylindrical filtering member alined with the tube and having its lower end secured about the upper end of the tube and its upper end free, a shell enclosing said filtering member in spaced relation thereto to form a chamber about the filtering member, an inlet neck extending from said shell, a bottom for said chamber carried by said spout and engaging the lower end of said shell, a stem carried by and extending upwardly from the upper end of the filtering member, and means adjustably carried by said stem for removably securing said shell in place with the lower end thereof in sealed engagement with the bottom.

4. In a filter of the character described, a tube constituting an outlet spout for the filter, a hollow filtering member of rigid material carried by the upper end of said spout, a shell enclosing said filtering member and spaced therefrom to form a chamber about the filtering member, said shell having an inlet, a bottom for said chamber carried by said spout and engaging the lower end of the shell, and means carried by the filtering member for removably securing said shell in place.

5. In a filter of the character described, a tube constituting an outlet spout for the filter, a hollow filtering member of rigid material carried by the upper end of said spout, a shell enclosing said filtering member and spaced therefrom to form a chamber about the filtering member, said shell having an inlet, a bottom for said chamber carried by said spout and having an upstanding marginal flange fitting about the lower end of said shell, a gasket between the bottom and the lower end of the shell to form a sealed joint, a threaded stem fixed to and extending upwardly from the filtering member and through the top of the shell, and a nut threaded on said stem to force the shell downwardly and firmly hold the shell in place and apply pressure to compress the gasket and form a sealed joint.

6. In a filter of the character described, a tube constituting an outlet spout for the filter, a flange surrounding said spout in spaced relation to the upper end thereof, a hollow filtering member consisting of rods extending from the upper end of said spout longitudinally thereof and spaced from each other circumferentially of the spout with their lower ends extending into the spout and secured thereto, a disc having upper ends of said rods secured thereto, rings surrounding said rods and spaced from each other longitudinally of the rods, a tube of foraminous material surrounding said rings in contact therewith and having its upper end secured about the peripheral edge face of said disc and its lower end portion fitting about the spout and secured thereto above the flange, a threaded stem extending upwardly from said disc, a shell enclosing the filtering member in spaced relation thereto and having a side inlet and an open lower end resting upon said flange, a head for the upper end of said shell, said stem extending through the head of said shell, and a nut threaded on said stem and engaging the head of the shell to force the shell downwardly firmly into place upon the flange and firmly but removably hold the shell in place.

JESS L. VAN PELT.